United States Patent
Frost et al.

(10) Patent No.: US 10,889,377 B1
(45) Date of Patent: Jan. 12, 2021

(54) BRAKING AIRCRAFT TABLE SYSTEM

(71) Applicant: B/E Aerospace, Inc., Winston-Salem, NC (US)

(72) Inventors: Ian L. Frost, Winston-Salem, NC (US); John R. Kuyper, Winston-Salem, NC (US)

(73) Assignee: B/E Aerospace, Inc., Winston-Salem, NC (US)

(*) Notice: Subject to any disclaimer, the term of this patent is extended or adjusted under 35 U.S.C. 154(b) by 0 days.

(21) Appl. No.: 16/456,110

(22) Filed: Jun. 28, 2019

(51) Int. Cl.
*B64D 11/06* (2006.01)

(52) U.S. Cl.
CPC ................ *B64D 11/0605* (2014.12)

(58) Field of Classification Search
CPC ...... B64D 11/0605; A47B 5/00; A47D 1/0081
USPC ........... 108/42, 143, 152; 297/143, 150, 147
See application file for complete search history.

(56) References Cited

U.S. PATENT DOCUMENTS

| | | | |
|---|---|---|---|
| 6,059,364 A | 5/2000 | Dryburgh et al. | |
| 7,100,515 B2* | 9/2006 | Helm | B23Q 1/5481 108/143 |
| 7,490,643 B2* | 2/2009 | Liu | B23D 47/025 108/143 |
| 7,963,231 B2* | 6/2011 | Osborne | A47B 5/006 108/40 |
| 8,171,862 B2* | 5/2012 | Muirhead | B64D 11/0015 108/44 |
| 8,528,968 B2* | 9/2013 | Moulton | B64D 11/0605 297/147 |
| 8,596,206 B2* | 12/2013 | Legeay | B60N 3/002 108/137 |
| 8,616,137 B2 | 12/2013 | Collins et al. | |
| 8,979,189 B2 | 3/2015 | Henshaw et al. | |
| 9,708,066 B2* | 7/2017 | Thompson | B64D 11/0638 |
| 9,783,303 B2* | 10/2017 | Gagnon | B64D 11/06 |
| 9,815,556 B2* | 11/2017 | Helwig | B64D 11/0638 |
| 10,023,315 B2 | 7/2018 | Kuyper et al. | |
| 10,562,634 B2* | 2/2020 | Marais | B64D 11/0638 |
| 10,674,829 B2* | 6/2020 | Pozzi | B64D 11/0638 |
| 2006/0220425 A1 | 10/2006 | Becker et al. | |
| 2007/0145791 A1 | 6/2007 | Strasser | |
| 2009/0146005 A1* | 6/2009 | Bettell | B64D 11/0605 244/118.6 |
| 2010/0193634 A1* | 8/2010 | Hankinson | B64D 11/0605 244/118.6 |

(Continued)

*Primary Examiner* — Jose V Chen
(74) *Attorney, Agent, or Firm* — Suiter Swantz pc llo

(57) ABSTRACT

A braking table system for use in an aircraft cabin includes a rail mountable to a fixed structure in the aircraft cabin, the fixed structure adjacent a seat assembly, and, a table assembly mounted on and selectively movable along the rail. The table assembly includes a support deck engaged with the rail, a tabletop mounted on the support deck, and a braking mechanism carried by the support deck. The braking mechanism automatically engages the rail thereby preventing movement of the support deck relative to the seat assembly, and, upon user action moving the tabletop, the braking mechanism permits movement of the table assembly along the rail. The braking mechanism includes brake arms, each permitting movement of the table assembly in a respective direction, and, in the absence of user action moving the tabletop relative to the support deck, preventing opposite movement of the table assembly.

14 Claims, 8 Drawing Sheets

(56) References Cited

U.S. PATENT DOCUMENTS

| | | | |
|---|---|---|---|
| 2013/0093221 A1* | 4/2013 | Ligonniere | B64D 11/06 297/173 |
| 2014/0373759 A1* | 12/2014 | Rumeau | A47B 1/05 108/44 |
| 2015/0284088 A1* | 10/2015 | Gow | A47B 5/006 297/174 R |
| 2015/0284089 A1 | 10/2015 | Gow et al. | |
| 2015/0321592 A1* | 11/2015 | De Morais | A47B 5/006 297/147 |
| 2016/0375810 A1* | 12/2016 | Kong | B60N 2/793 297/145 |
| 2020/0130838 A1* | 4/2020 | Beaudin | G06F 3/0426 |
| 2020/0140091 A1* | 5/2020 | Pence | A47B 5/04 |

\* cited by examiner

BRAKING AIRCRAFT TABLE SYSTEM

BACKGROUND

A typical economy class aircraft passenger seat in a second or subsequent row is positioned to permit a seated occupant to reach and use a tray table that pivots from the back of an adjacent forward seat. Adjustment of the position of such a conventional and traditional tray table is quite limited given that the tray table reaches its in-use position only as it reaches a horizontal position in its pivotal movement. Some degree of fore-aft adjustment is offered in some tray mounts relative to the forward seat. However, due to space constraints, for example in economy class seating, and due to the mechanics of the mounts, that fore and aft adjustment is typically quite limited. In seating arrangements offering seats that only minimally recline, such limited adjustment range for the position of a tray table may be all that is expected and accommodated by the spacing between seats.

However, in order to provide a range of accommodations to passengers having varying travel budgets, seating is being offered with increased personal spaces and increased senses of privacy and comfort. For example, modular seating is available in which partition walls and other dividers are provided between seats, and seats are provided with full comfort lay back features. Traditional pivoting seat back mounted tray tables are not well suited for such premium accommodations, nor are they suited for seating arrangements where no forward seats are available.

While passengers prefer tray tables that conveniently stow and deploy for use, stability of a tray table should be provided to assure passenger safety and to prevent accidents such as the spilling of beverages or the dropping of personal items. The movement of tray tables should occur only as intended, and any locking, latching, or braking features should be intuitively controllable.

Accordingly, an improved deployable tray table is needed by which stability at a fixed deployment position is assured and selective adjustment is intuitively permitted.

SUMMARY OF THE INVENTIVE ASPECTS

To achieve the foregoing and other advantages, the inventive aspects disclosed herein are directed to a braking table system for mounting on a fixed structure in an aircraft cabin. The braking table system includes a rail for mounting on the fixed structure, and a table assembly mounted on and selectively movable along the rail, the table assembly including a support deck engaged with the rail, a tabletop mounted on the support deck, and a braking mechanism carried by the support deck. The braking mechanism automatically engages the rail thereby preventing movement of the support deck relative to the rail, and, upon user action moving the tabletop relative to the support deck, the braking mechanism permits movement of the table assembly relative to the rail.

In some embodiments, the table assembly is mounted on the rail for linear movement in a first direction toward a stowed position, and linear movement in a second direction opposite the first direction toward deployment. The braking mechanism includes a first brake arm permitting movement of the table assembly in the second direction and, in the absence of user action moving the tabletop relative to the support deck, preventing movement of the table assembly in the first direction by engaging the rail. A second brake arm permits movement of the table assembly in the first direction and, in the absence of user action moving the tabletop relative to the support deck, prevents movement of the table assembly in the second direction by engaging the rail.

In some embodiments, the first brake arm extends diagonally toward the rail and in the first direction, and the second brake arm extends diagonally toward the rail and in the second direction.

In some embodiments, the tabletop includes a brake release bar that extends in a space between the first brake arm and second brake arm, and, upon user action moving the tabletop relative to the support deck, the brake release bar disengages at least one of the first brake arm and second brake arm from the rail.

In some embodiments, the space is V-shaped.

In some embodiments, the braking mechanism includes first and second biasing elements pressing the first and second brake arms toward the brake release bar.

In some embodiments, the table assembly is mounted on the rail for linear movement in a first direction toward a stowed position, and linear movement in a second direction opposite the first direction. Upon the table assembly reaching the fully stowed position by movement in the forward direction, the braking mechanism automatically assumes a latched condition locking the table assembly in the fully stowed position.

In some embodiments, the braking mechanism includes at least one brake arm that engages a latching slot of the rail upon the table assembly reaching the fully stowed position by movement in the forward direction.

In some embodiments, the table assembly comprises an actuator such as a button, and, upon user action pressing the button, the braking mechanism is released from the latched condition to an unlatched condition permitting movement of the table assembly away from the fully stowed position.

In some embodiments, a peripheral wall extends from the tabletop defining a receptacle area that receives the support deck, and a peripherally extending gap defined between the peripheral wall and support deck permits movement of the tabletop relative to the support deck to operate the braking mechanism.

In another aspect, the inventive concepts disclosed herein are directed to a braking table system for use in an aircraft cabin. The braking table system includes a rail mounted on a fixed structure in the aircraft cabin, the fixed structure adjacent a seat assembly, and, a table assembly mounted on and selectively movable along the rail. The table assembly includes a support deck engaged with the rail, a tabletop mounted on the support deck, and a braking mechanism carried by the support deck. The braking mechanism automatically engages the rail thereby preventing movement of the support deck relative to the seat assembly, and, upon user action moving the tabletop relative to the support deck, the braking mechanism permits movement of the table assembly relative to the seat assembly.

In some embodiments, the table assembly is mounted on the rail for linear movement in a first direction away from the seat assembly correspond to a stowed direction or position, and linear movement in a second direction opposite the first direction corresponding to a deployed direction or position. The braking mechanism includes a first brake arm permitting movement of the table assembly in the second direction and, in the absence of user action moving the tabletop relative to the support deck, preventing movement of the table assembly in the first direction by engaging the rail, and a second brake arm permitting movement of the table assembly in the first direction and, in the absence of user action moving the tabletop relative to the support deck, preventing movement of the table assembly in the second direction by engaging the rail.

In some embodiments, the table assembly is mounted on the rail for linear movement in a first direction away from the seat assembly to a stowed position, and linear movement in a second direction opposite the first direction. Upon the table assembly reaching the stowed position by movement in the forward direction, the braking mechanism automatically assumes a latched condition locking the table assembly in the stowed position.

In some embodiments, the table assembly comprises an actuator such as a button, and, upon user action pressing the button, the braking mechanism is released from the latched condition to an unlatched condition permitting movement of the table assembly from the stowed position toward the seat assembly.

Embodiments of the inventive concepts may include one or more or any combination of the above aspects, features and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated, and some features may be omitted or may be represented schematically in the interest of clarity. Like reference numbers in the drawings may represent and refer to the same or similar element, feature, or function. In the drawings.

DETAILED DESCRIPTIONS

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities. The aspects, features and functions described below in connection with one embodiment are intended to be applicable to the other embodiments described below except where expressly stated or where an aspect, feature or function is incompatible with an embodiment.

Figure 1:
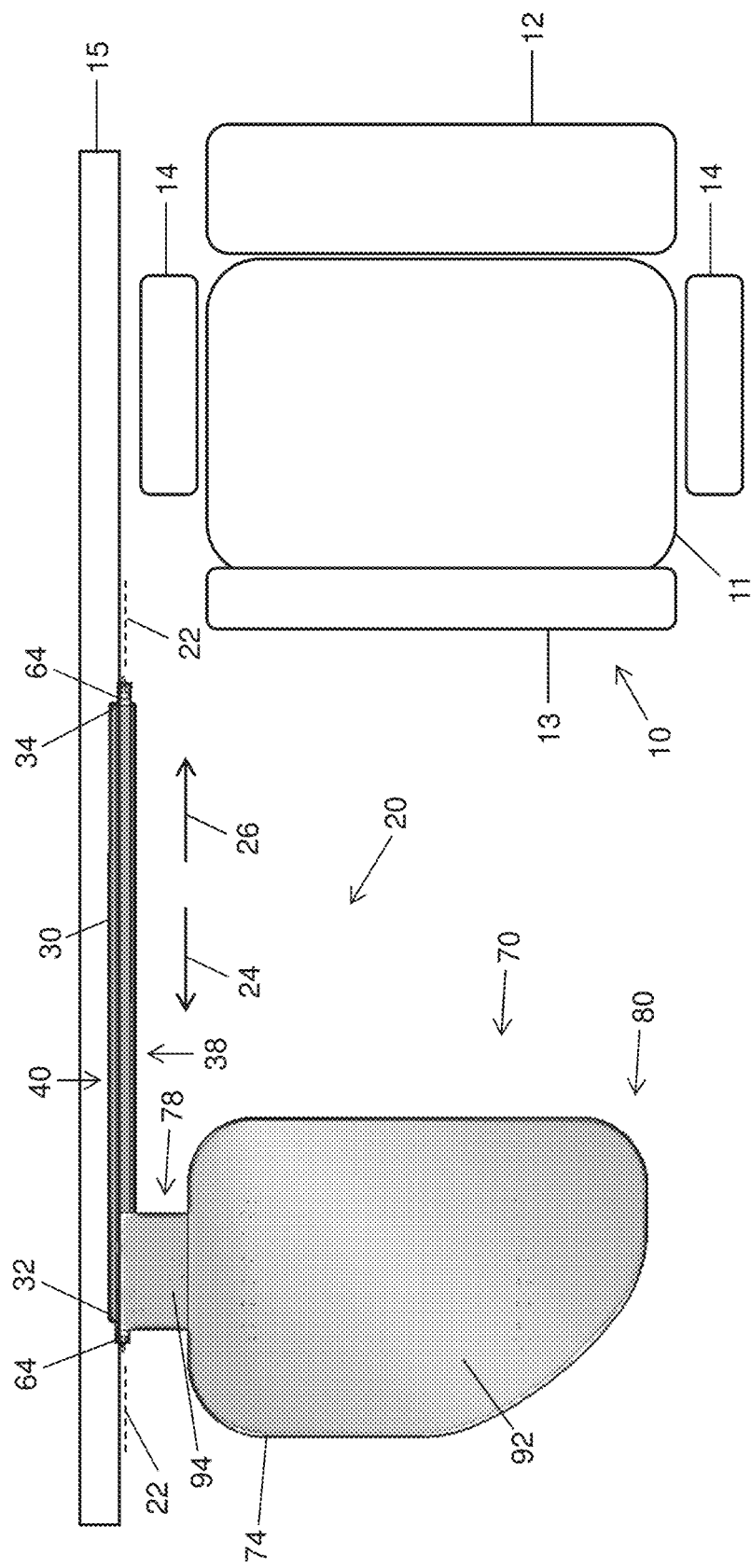
FIG. 1 is a top plan view of a braking table system, according to the present disclosure, in a stowed condition forward of a seat assembly.

A braking table system according to the present disclosure is useful in, for example, an aircraft cabin environment. A seat assembly 10 is shown in FIG. 1 to represent many types of seating assemblies and arrangements. The illustrated seat assembly 10 has a seat 11, backrest 12, leg rest 13, and armrests 14. The seat assembly is shown adjacent a fixed structure 15 representing a wall, partition, divider, or other element in, for example, an aircraft cabin. The seat assembly 10 can be provided in any aircraft cabin seating class environment and may be within a suite or other modular passenger accommodation arrangement. The seat assembly 10 may have reclining and/or lay flat features for the comfort of an occupant. The seat assembly is illustrated and described to provide an example use of the braking table system, which is the subject of this disclosure.

Figure 2:
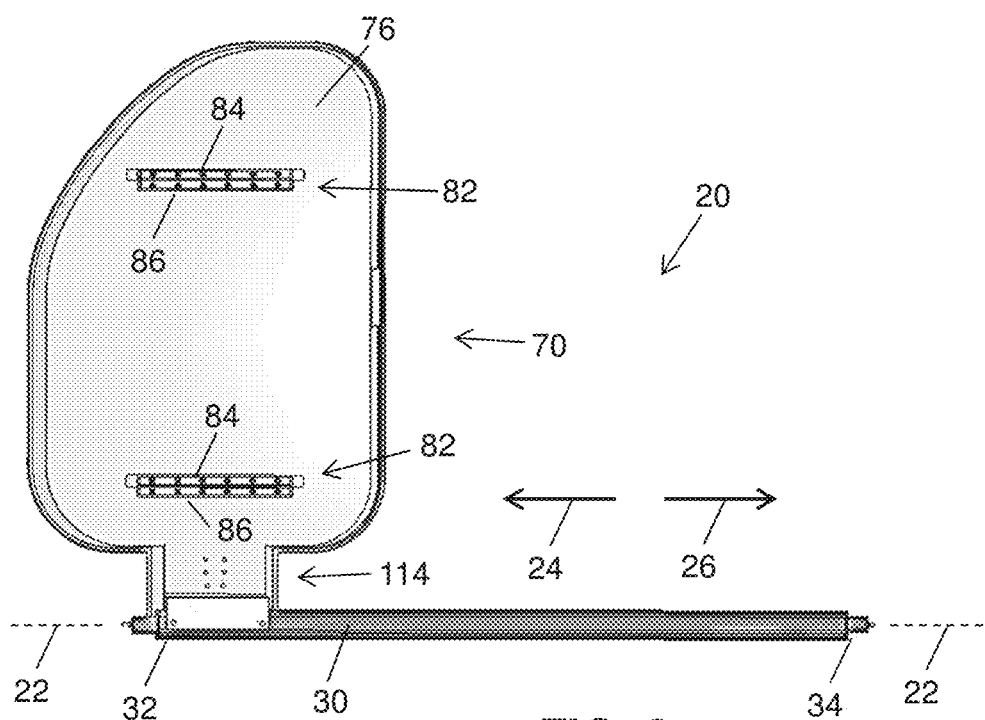
FIG. 2 is a bottom plan view of the braking table system of FIG. 1.
Figure 3:
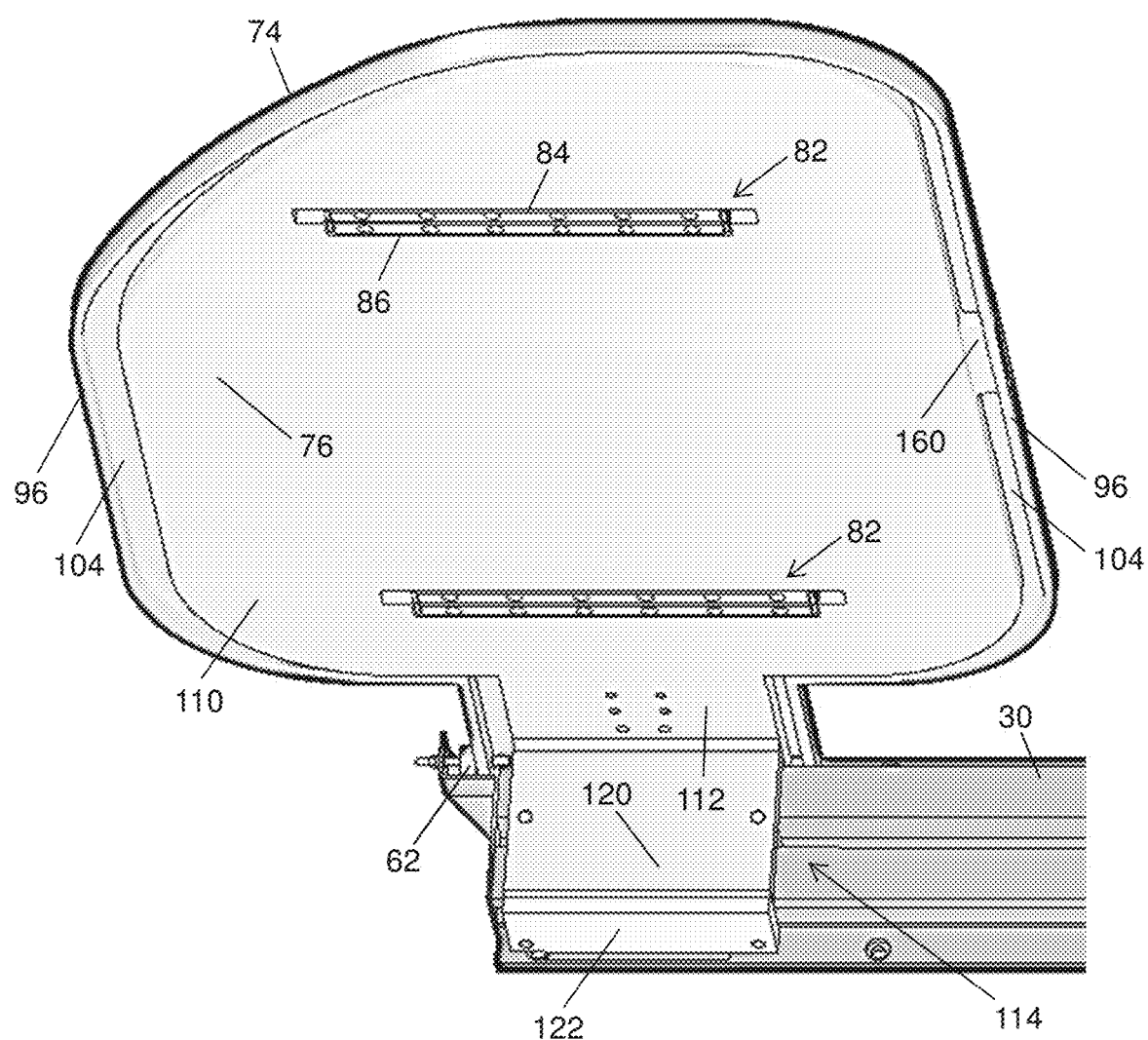
FIG. 3 is a bottom perspective view of the braking table system of FIG. 1.

A braking table system 20 includes a linear support rail 30 and a table assembly 70 that is selectively movable along the rail 30. For convention in these descriptions, the rail 30 is described as having a longitudinal axis 22 (FIGS. 1-2) along which the table assembly 70 can travel linearly in two opposing directions. A first of the two directions is referenced in the drawings as a forward longitudinal direction 24, and a second of the two directions is referenced as a rearward longitudinal direction 26. These terms are chosen with respect to a user's perspective from which the first direction 24 is perceived as away from the user and the second direction 26 is perceived as toward the user. The table assembly 70 is shown at a first end 32 of the rail 30 in the drawings, positioned as far as possible in the forward direction 24. Such a position may correspond to a stowed position or fully stowed position of the table assembly 70 away from a user such as the occupant of an aircraft seat. The table assembly 70 can also be positioned at other positions along the rail 30 between the illustrated stowed position and the second end 34 of the rail 30, with such other positions corresponding to deployed positions for convenient selection by a user.

The table assembly 70 includes a braking mechanism 72 (FIG. 13) by which movement along the rail 30 is selectively permitted or prevented. The braking mechanism 72 is intuitively controlled by user action displacing an upper tabletop 74 from a braked position relative to a lower support deck 76, both of which are components of, and travel relative to the rail 30 with, the table assembly 70. The braking mechanism 72 automatically engages the rail 30, thereby preventing movement of the support deck relative to the rail. However, upon user action moving the tabletop 74 relative to the support deck 76, the braking mechanism 72 permits movement of the table assembly relative to the rail.

The table assembly 70 generally has a proximal lateral side 78 attached to the rail 30 and extends laterally from the rail 30 in cantilever fashion. An opposite distal lateral side 80 of the table assembly 70 extends from the rail 30, supported entirely by the rail 30 and the engagement of the proximal lateral side 78 with the rail 30.

In the illustrated embodiment, the proximal lateral side 78 mounted to the rail 30 corresponds to the right side of the table assembly 70 from a user's perspective, for example that of an occupant of the seat assembly 10 represented in FIG. 1. The distal lateral side 80 corresponds in that example to the left side. In other embodiments, the tabletop 74 has a left side mounted to the rail 30. Thus, these descriptions relate as well to an embodiment in which the described and illustrated features are reflected about the longitudinal axis 22 in mirror symmetry. In either embodiment, features of the table assembly 70 extending away from the rail 30 can be termed as distal and features extending toward the rail can be termed as proximal.

The tabletop 74 generally covers the support deck 76 from above. The tabletop 74 is slidably mounted on the support deck 76 by sliding rail devices 82 that extend longitudinally. Each sliding rail device 82 has a first rail portion 84 attached to the tabletop 74 and a second rail portion 86 attached to the support deck 76. Two rail devices 82 are expressly illustrated as laterally spaced. This arrangement assures smooth longitudinal movement of the tabletop 74 relative to the lower support deck 76, for example by user action to release the braking mechanism 72 as described below.

Figure 4:
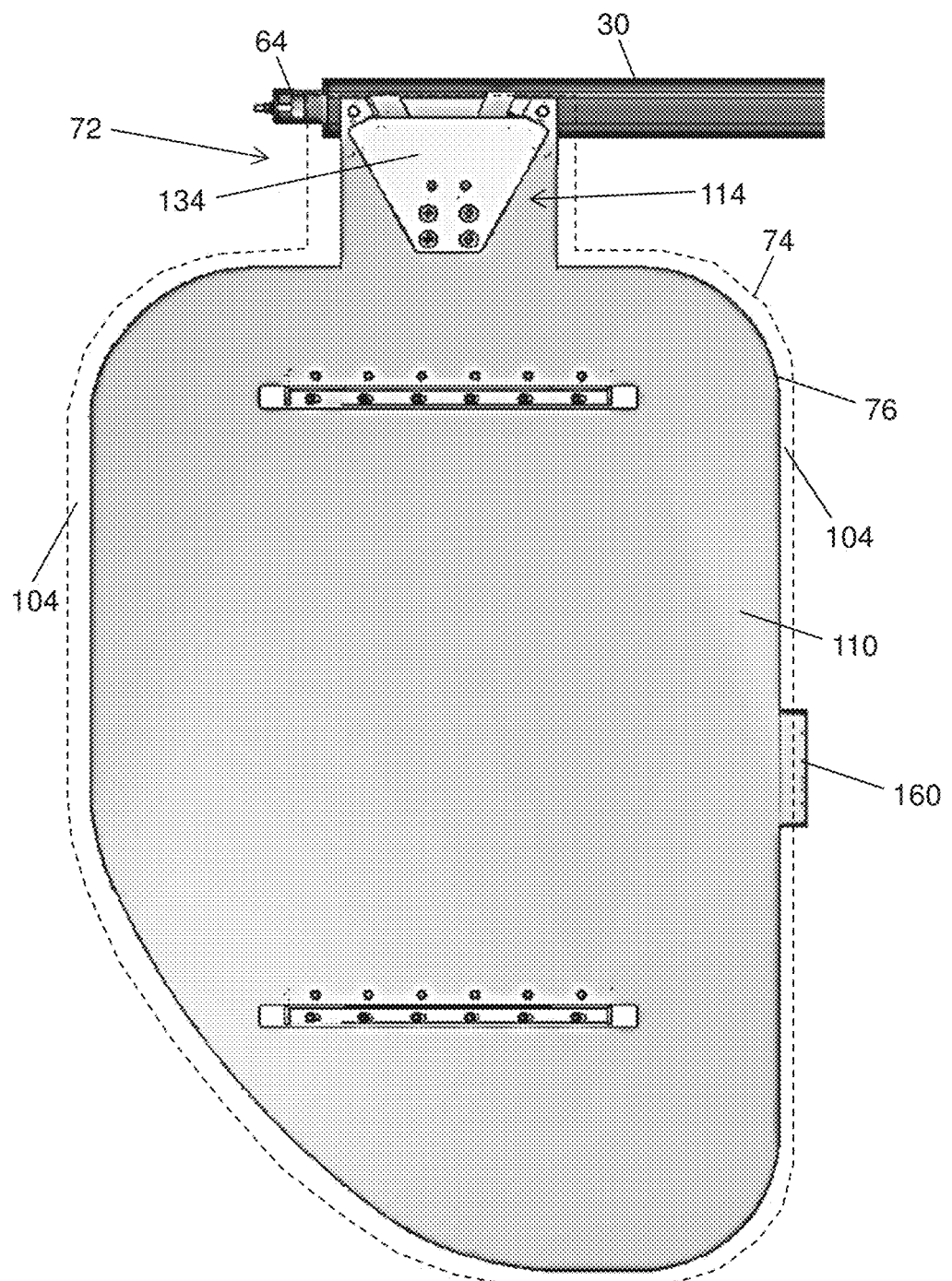
FIG. 4 top plan view as in FIG. 1, with a tabletop of the braking table system represented in dashed lines to illustrate a support deck and braking mechanism thereof.
Figure 5:
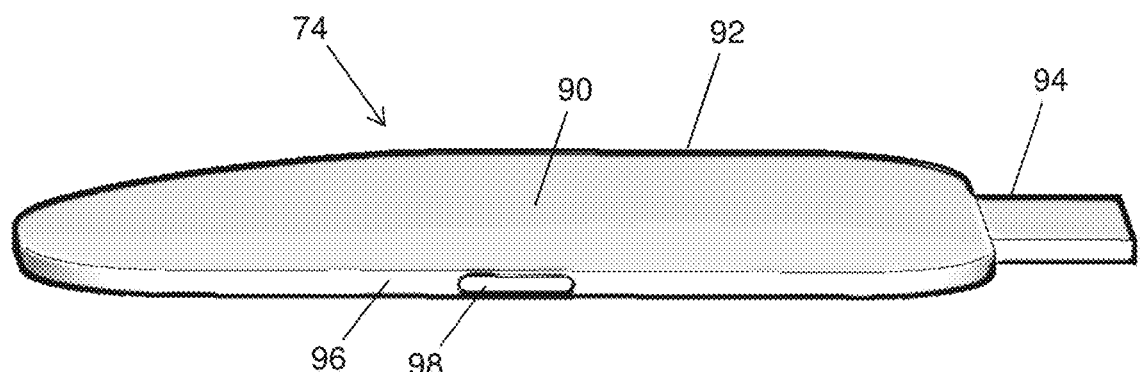
FIG. 5 is a top perspective view of the tabletop of the braking table system of FIG. 1.
Figure 6:
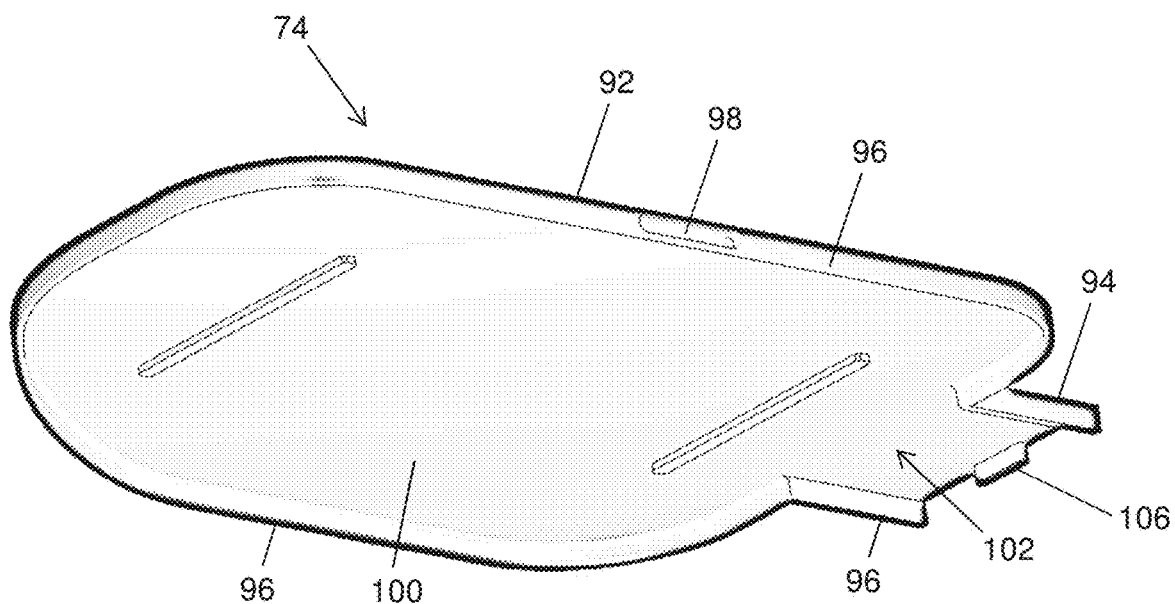
FIG. 6 is a bottom perspective view of the tabletop of FIG. 5.

The tabletop 74 is represented as dashed line in FIG. 4 for illustration of its arrangement relative to the support deck 76. In FIG. 5, the tabletop 74 is represented as a one-piece contiguous structure having a generally planar upper surface 90 (FIGS. 1,5) for passenger use as a table surface. The tabletop 74 has a main tray portion 92 and an arm portion 94 that extends toward the rail 30 from the main tray portion. A peripheral wall 96 extends downward from the lower surface 100 of the tabletop 74 opposite the upper surface, defining a downward opening shallow receptacle area 102 that receives the support deck 76. The support deck 76 is at least partially shrouded by the peripheral wall 96.

A peripherally extending gap 104 defined between the wall 96 and support deck 76 permits longitudinal movement of the tabletop 74 along the rail devices 82 relative to the support deck within a range sufficient to operate the braking mechanism 72. A distal side of the main tray portion 92 of the tabletop 74 defines the distal lateral side 80 of the table assembly 70, with the peripheral wall 96 in that portion of the tabletop defining the distal lateral edge of the table assembly 70. The peripheral wall 96 is discontinued at the proximal side of the arm portion 94, which approximately meets the rail 30. A longitudinally extending brake release bar 106 extends downward from the lower surface of the tabletop 74 at the proximal side of the arm portion adjacent the rail 30.

The support deck 76 has a main tray portion 110 below the main tray portion 92 of the tabletop 74. Similarly, the support deck 76 has an arm portion 112 below the arm portion 94 of the tabletop 74. The arm portion 112 of the support deck 76 extends toward the rail 30. At the proximal side of the table assembly 70 adjacent the rail 30, a traveling bracket 114 of the table assembly 70 travels along the rail and supports the entirety of the table assembly 70. The traveling bracket 114 is defined cooperatively by: the proximal edge 116 of the arm portion 112 of the support deck 76; a downward extending slat 120 connected to the lower surface of the arm portion 112; and a laterally extending plank 122 connected to the lower surface of the slat 120.

Figure 7:
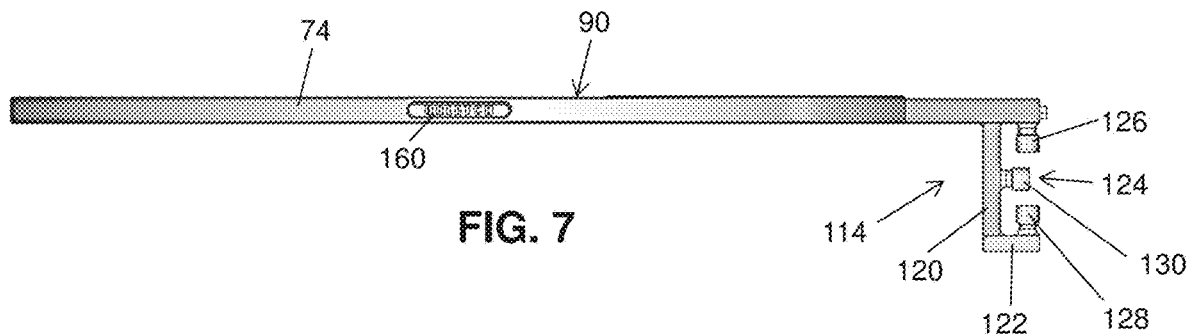
FIG. 7 is an elevation view of the braking table system of FIG. 1.

Below the proximal edge 116 of the arm portion 112, and above the slat 120, the traveling bracket 114 defines a longitudinally extending and laterally opening channel 124 (FIG. 7) that receives and engages a lateral side of the rail 30. Into the channel 124, upper rollers 126 extend downward from a proximal lateral edge 116 of the arm portion 112, lower rollers 128 extend upward from the plank 122, and central rollers 130 extend laterally from the slat 120 toward the rail 30.

Figure 9:
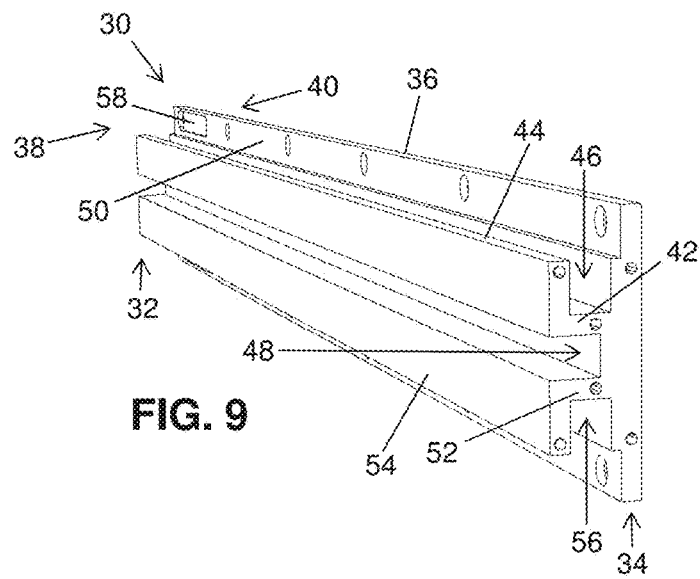
FIG. 9 is a perspective view of a support rail of the braking table system of FIG. 1.

As shown in FIG. 9, the rail 30 has a longitudinally extending main plate 36 having a first lateral side 38 for engaging and supporting the table assembly 70, and a second lateral side 40 for connection to a host structure, such as the wall of an aircraft or other structure 15 in an aircraft passenger seating area as represented in FIG. 1. The structure of the rail 30 defines multiple longitudinally extending channels for receiving and engaging the rollers on which the table assembly 70 travels. A longitudinally extending horizontal first plank 42 is connected to the first side 38 of the main plate 36, and a longitudinally extending vertical first slat 44 extends upward from the first plank, such that an upward opening and horizontally extending upper first channel 46 is defined between the main plate 36 and first slat 44 for receiving and engaging the upper rollers 126. A longitudinally extending horizontal second plank 52 is connected to the first side 38 of the main plate 36 below the first plank 42, and a longitudinally extending vertical second slat 54 extends downward from the second plank 52, such that an downward opening and horizontally extending lower second channel 56 is defined between the main plate and second slat for receiving and engaging the lower rollers 128. The first plank 42 and second plank 52 are parallel and vertically spaced from each other such that a laterally opening and longitudinally extending intermediate third channel 48 is defined for receiving and engaging the central rollers 130.

By engagement of the first lateral side 38 of the rail 30 in the channel 124 defined by the traveling bracket 114, and by receipt of the upper rollers 126, lower rollers 128, and central rollers 130 in the respective upper channel 46, lower channel 56, and intermediate channel 48 of the rail 30, the proximal side 78 of the table assembly 70 is supported and retained by the rail. The horizontally extending central rollers 130 support vertical loads, and the vertically extending upper and lower rollers 126 and 128 support horizontal and cantilever loads.

Figure 8:
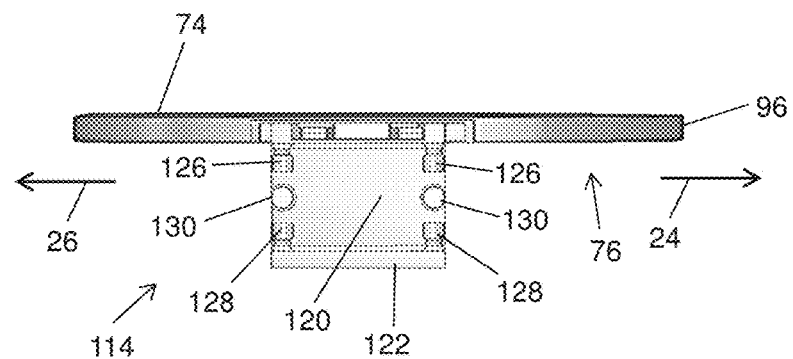
FIG. 8 is a side elevation view of the braking table system of FIG. 1.

As shown in FIG. 8, a first upper roller 126 extends downward from the forward longitudinal end of the arm portion of the support deck 76, a first lower roller 128 extends upward from the forward longitudinal end of the plank 122, and a first central roller 130 extends horizontally from the forward longitudinal end of the slat 120. Similarly, a second upper roller 126 extends downward from the rearward longitudinal end of the arm portion of the support deck 76, a second lower roller 128 extends upward from the rearward longitudinal end of the plank 122, and a second central roller 130 extends horizontally from the rearward longitudinal end of the slat 120. Thus, there are two upper rollers 126, two lower rollers 128, and two central rollers 130 in the illustrated embodiment. This arrangement assures smooth linear longitudinal movement of the table assembly 70 along the rail 30 upon release of the braking mechanism 72.

Figure 10:
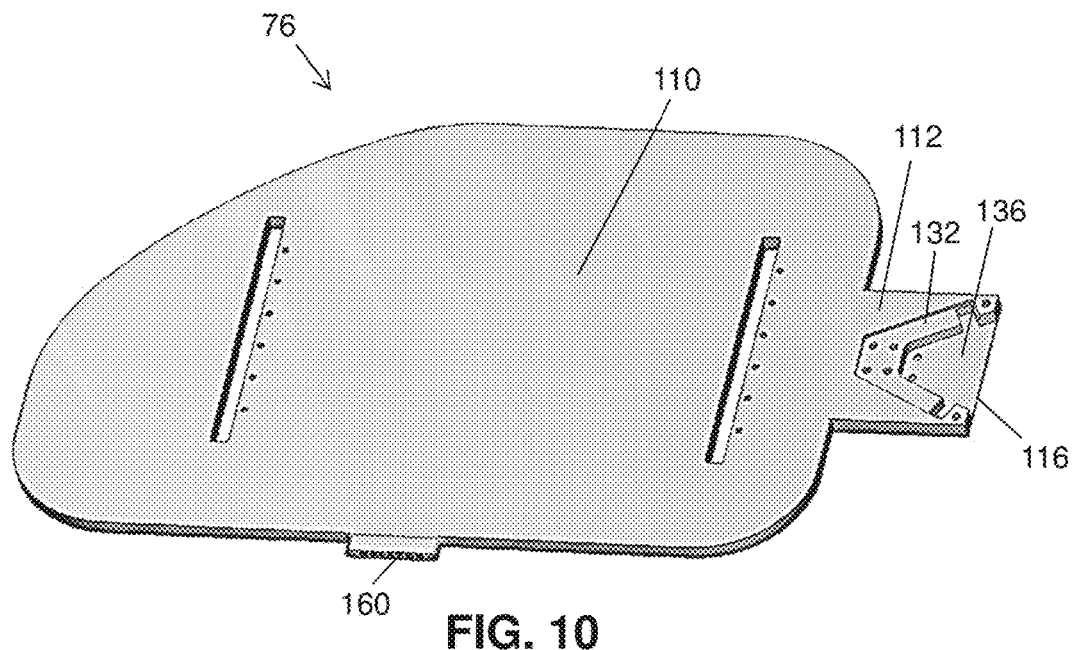
FIG. 10 is a top perspective view of the support deck of FIG. 4 without the braking mechanism.
Figure 11:
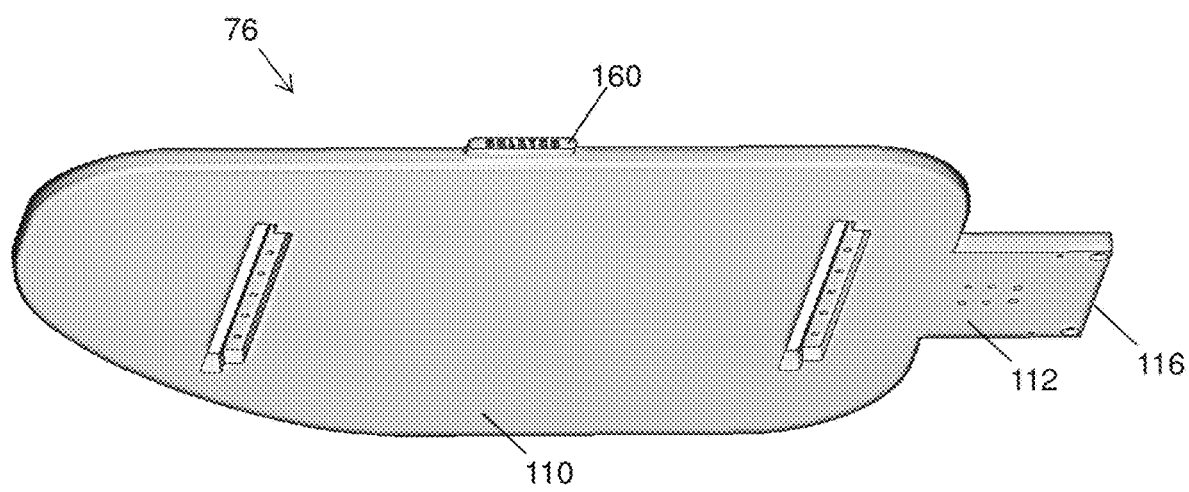
FIG. 11 is a bottom perspective view of the support deck of FIG. 10.

The support deck 76 carries the braking mechanism 72 in staged recesses defined in the upper surface of the arm portion 112. A shallow first stage recess 132 (FIG. 10) receives a correspondingly shaped cover plate 134 (FIG. 4) of the braking mechanism 72 that lies flush with the planar upper surface facilitating smooth movement of the tabletop 74. A deeper second stage recess 136 formed in the first stage recess 132 accommodates pivoting movements of pivotable diagonally disposed brake arms arranged in a V pattern by way of the brake arms extending in a same lateral direction but opposing longitudinal directions. A first or forward brake arm 140 has a distal end 142 pivotally attached to the support deck 76 by a first or forward axle post 144 that extends vertically through the second stage recess and is attached at opposing vertical ends to the support deck 76 and cover plate 134. A second or rearward brake arm 150 has a distal end 152 similarly pivotally attached to the support deck 76 and cover plate 134 by a second or rearward axle post 154. The forward brake arm 140 extends diagonally from the forward axle post 144 laterally toward the rail 30 and longitudinally in the forward first direction 24. The rearward brake arm 150 extends diagonally from the rearward axle post 154 laterally toward the rail 30 and longitudinally in the rearward second direction 26. Each brake arm, by dragging along the rail 30, permits movement of the table assembly 70 in a longitudinal direction opposite its longitudinal extension. That is, the forward brake arm 140 permits movement of the table assembly 70 in the rearward direction 26 in which the forward brake arm 140 trails. Similarly, the rearward brake arm 150 permits movement of the table assembly 70 in the forward direction 24 in which the rearward brake arm 150 trails.

In either direction of potential movement, friction between the proximal end of the leading brake arm and the rail 30 urges the leading brake arm to pivot toward the rail for tighter engagement, providing automatic braking. That is, the forward brake arm 140, when engaged with the rail 30 at its proximal end 146, resists forward movement in which the forward brake arm leads. Similarly, the rearward brake arm 150, when engaged with the rail 30 at its proximal end 156, resists rearward movement in which the rearward brake arm leads.

Figure 12:
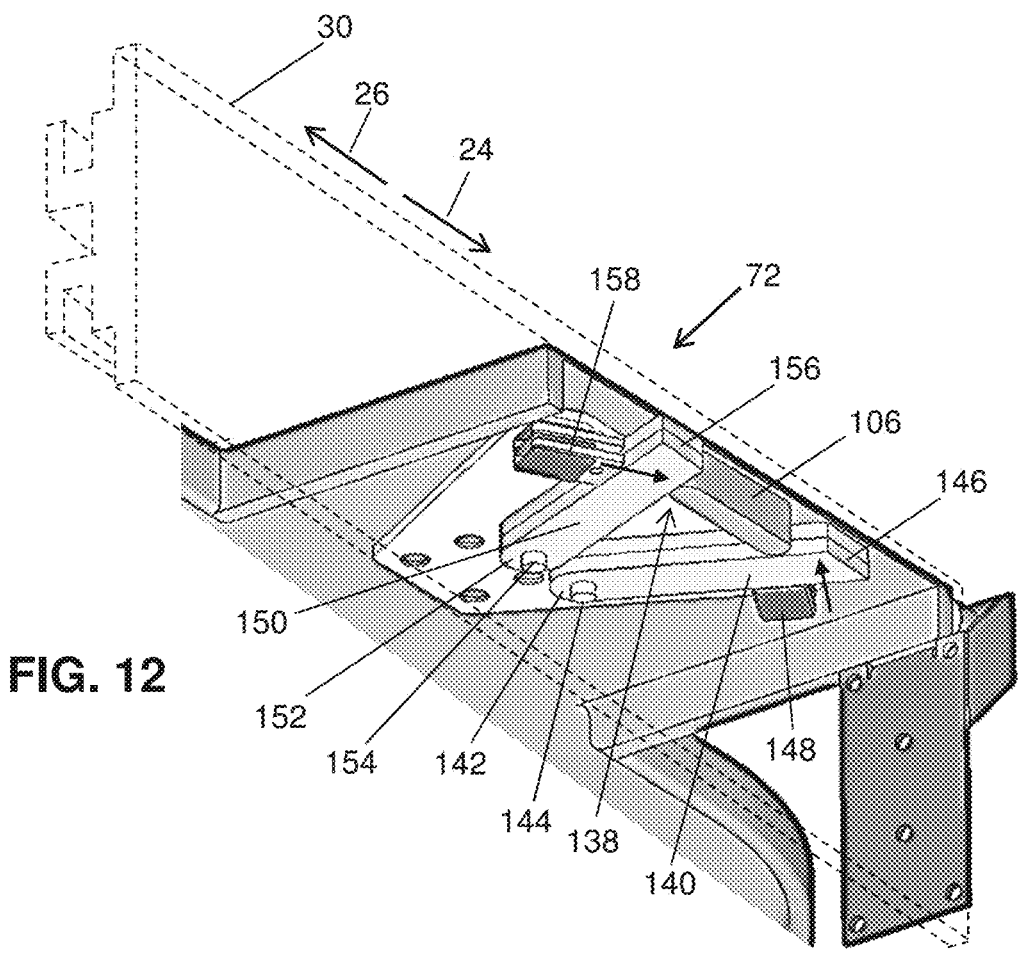
FIG. 12 is a bottom perspective view representing the support rail in dashed line to illustrate components of the braking mechanism and tabletop without the support deck.

Each brake arm is persistently biased toward the rail 30 by a respective biasing element. A first biasing element 148 presses the forward brake arm 140 to pivot rearward toward the rail 30. A second biasing element 158 presses the rearward brake arm 150 to pivot forward toward the rail 30. The brake release bar 106 that extends downward from the lower surface of the tabletop 74 extends into a V shaped gap 138 (FIG. 12) between the brake arms 140 and 150 that converge toward their pivotally attached distal ends and diverge toward their proximal ends that engage the rail 30. The biasing elements, each pressing a respective brake arm into the gap, cooperate to close the brake arms toward respective longitudinal ends of the brake release bar 106. This provides an automatically centering feature by which the brake release bar 106, and tabletop 74 therewith, settles into a centered longitudinal position, as permitted by the sliding rail devices 82, between generally symmetrically arranged brake arms.

At a typical position of the table assembly 70 along the rail 30, without user action upon the table assembly 70, the tabletop 74 is generally longitudinally centered over the support deck 76 and the brake arms both contact and engage the rail, such that movement of the table assembly 70 is prevented by the braking mechanism 72. Thus, the biasing elements automatically maintain the braking mechanism 72 as engaged in the absence of user action on the tabletop 74, such that, in the absence of user action moving the tabletop relative to the support deck, the forward and rearward brake arms respectively prevent movement of the table assembly in the forward and rearward directions respectively. Thus, the table assembly 70 is advantageously prevented from movement along the rail in the absence of user action on the tabletop 74. Thus, the table assembly 70 remains stationary relative to the rail 30, structure 15, and seat assembly 10 (FIG. 1) without unintended motion during, for example, moments of turbulence, acceleration, and deceleration. The biasing elements in the illustrated embodiment are elastomeric or rubber elements acting as springs that resiliently and persistently press upon the brake arms. Other elements may be used, such as metal springs. The strength of the biasing elements is selected to resist movement of the tabletop 74 until a predetermined threshold of force is overcome corresponding to intentional user action on the tabletop 74.

Furthermore, at a typical position of the table assembly 70 along the rail 30, user action on the tabletop 74 can operate the braking mechanism 72 to permit movement of the table assembly 70 in the forward and rearward longitudinal directions. As a user presses the tabletop 74 in either longitudinal direction, the tabletop 74 moves accordingly from the centered longitudinal position relative to the support deck 76 as permitted by the rail devices 82. This moves the brake release bar 106 accordingly, which presses the leading brake arm to pivot against the force of its respective biasing element and disengage from the rail 30. Thus, pressing upon the tabletop 74 in the forward or rearward longitudinal direction releases the leading forward or leading rearward brake arm respectively from engagement, permitting the table assembly 70 to move in the intended direction.

The rail 30 includes a longitudinally extending brake engagement surface 50 that faces laterally toward the table assembly 70. The proximal ends 146 and 156 of the brake arms 140 and 150 contact and engage the brake engagement surface 50 at typical positions of the table assembly 70 along the rail 30. At any typical longitudinal position of the table assembly 70 between the longitudinal ends of the rail 30, movement of the table assembly 70 is automatically prevented by the braking mechanism 72 until an external force, such as that applied by a user, is applied to the tabletop 74 relative to the support deck 76 to disengage the leading brake arm from the brake engagement surface 50 with respect to the direction of movement intended by the user.

A respective bumper at each of the first end and second end of the rail 30 prevents longitudinal movement of the table assembly 70 between end points of its intended range. A rearward facing first bumper 62 at the forward first end 32 of the rail 30 contacts the forward edge of the arm portion of the tabletop 74 as the forward most position is reached. Similarly, a forward facing second bumper 64 at the rearward second end 34 of the rail 30 contacts the rearward edge of the arm portion of the tabletop 74 as the rearward most position is reached.

Figure 13:
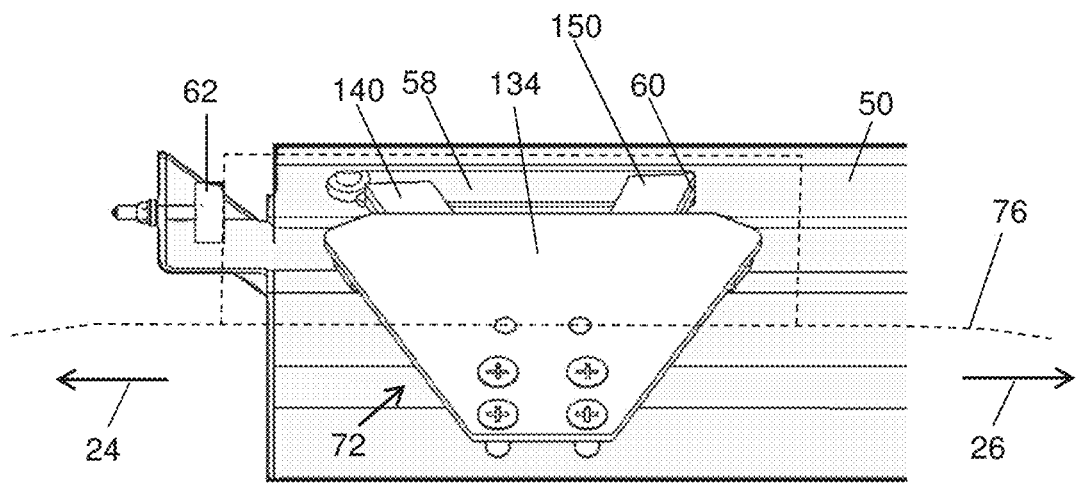
FIG. 13 is a top perspective view representing the tabletop in dashed line to illustrate the braking mechanism engaging the rail.

Adjacent the first end 32 of the rail 30, a latching slot 58 is defined in the brake engagement surface 50. The latching slot 58 extends longitudinally and opens laterally to receive the brake arms as the position of the locking slot is reached by the table assembly 70, for example as shown in FIG. 13. As each brake arm reaches the latching slot 58, it pivots into and engages the slot by force of the respective biasing element. Particularly as the trailing rearward brake arm 150 reaches the latching slot 58 at the end of forward movement of the table assembly 70 to the stowed position, the rearward brake arm 150 pivots into the latching slot 58, positively assuring engagement of the rearward brake arm with the rearward end of the slot where a ledge 60 separates the slot and brake engagement surface 50. This prevents rearward movement, in which the rearward brake arm 150 is the leading brake arm that resists such movement by engagement with the ledge 60. Thus, once the table assembly 70 reaches the stowed position by movement in the forward direction 24, engagement of the rearward brake arm 150 with the rearward end of the latching slot 58 automatically locks the table assembly in the stowed position to prevent unintended rearward movement, for example toward a seat occupant.

Receipt of the brake arms in the latching slot 58 defines a latched condition of the braking mechanism 72 and table assembly 70 at which user forces on the tabletop 74 alone in a direction of intended movement are insufficient to move the table assembly 70. For example, rearward movement by a user applied rearward force on the tabletop 74 in the stowed forward most position is prevented because the consequential rearward force on the rearward arm 150 applied way the brake release bar 106 press the rearward arm 150 against the ledge 60, trapping the proximal 156 end of the rearward brake arm between the bar 106 and ledge 60 in the latched condition. Forward movement by a user applied forward force on the tabletop 74 in the stowed forward most position is prevented because the forward edge of the arm portion of the tabletop 74 abuts the rearward facing first bumper 62 at the forward first end of the rail 30 as the forward most position is reached.

An unlatching feature of the braking table system 20 facilitates the release of the braking mechanism 72 from the latched condition and rearward movement of the table assembly 70 to deployed more rearward positions, for example for convenient selection and utilization by a user. As shown in FIGS. 3-7, a rearward directed button 160 extends from the rearward longitudinal end of the main tray portion 110 of the support deck 76 through an aligned slot 98 defined through the rearward end portion of the peripheral wall 96 of the tabletop 74. User action pressing upon the button 160 can move the support deck 76 forward relative to the tabletop 74 which abuts the first bumper 62. By such movement of the support deck 76, the rearward brake arm 150 is moved forward relative to the brake release bar 106 and pivoted out of the latching condition. This disengages the proximal end 156 of the brake arm 150 from the ledge 60 and releases the braking mechanism 72 from the latched condition to an unlatched condition in which the table assembly 70 can be moved rearward intuitively by user action pulling the tabletop 74 in the rearward direction 26. The button 160, as illustrated, may include text (such as "unlatch") or graphics indicia to inform a user of its function.

While the foregoing description provides embodiments of the invention by way of example only, it is envisioned that other embodiments may perform similar functions and/or achieve similar results. Any and all such equivalent embodiments and examples are within the scope of the present invention and are intended to be covered by the appended claims.

What is claimed is:

1. A braking table system for mounting on a fixed structure in an aircraft cabin, the braking table system comprising:
    a rail mountable on the fixed structure; and
    a table assembly mounted on and selectively movable along the rail, the table assembly comprising a support deck engaged with the rail, a tabletop mounted on the support deck, and a braking mechanism carried by the support deck,
    wherein, the braking mechanism automatically engages the rail thereby preventing movement of the support deck relative to the rail, and, upon user action moving the tabletop relative to the support deck, the braking mechanism permits movement of the table assembly relative to the rail,
    wherein, the table assembly is mounted on the rail for linear movement in a first direction, and linear movement in a second direction opposite the first direction,
    wherein, the braking mechanism comprises a first brake arm biased toward the rail permitting movement of the table assembly in the second direction and, in the absence of user action moving the tabletop relative to the support deck, preventing movement of the table assembly in the first direction by engaging the rail, and a second brake arm biased toward the rail permitting movement of the table assembly in the first direction, in the absence of user action moving the tabletop relative to the support deck, preventing movement of the table assembly in the second direction by engaging the rail, and
    wherein, the first brake arm extends diagonally toward the rail and in the first direction, and the second brake arm extends diagonally toward the rail and in the second direction.

2. The braking table system of claim 1, wherein the tabletop comprises a brake release bar that extends in a space between the first brake arm and second brake arm, and, upon user action moving the tabletop relative to the support deck, the brake release bar disengages at least one of the first brake arm and second brake arm from the rail.

3. The braking table system of claim 2, wherein the space is V shaped.

4. The braking table system of claim 2, wherein the braking mechanism comprises first and second biasing elements pressing the first and second brake arms toward the brake release bar.

5. The braking table system of claim 1, wherein the rail includes a latching slot, and wherein at least one of the first and second brake arms engages in the latching slot when the table assembly reaches a stowed position, by movement of the table assembly in the first direction, to lock the table assembly in the stowed position.

6. The braking table system of claim 5, wherein, the table assembly comprises an actuator, and upon actuation of the actuator, the braking mechanism is released from the latched condition to an unlatched condition permitting movement of the table assembly from the stowed position.

7. The braking table system of claim 1, wherein a peripheral wall extends from the tabletop defining a receptacle area that receives the support deck, and a peripherally extending gap defined between the peripheral wall and support deck permits movement of the tabletop relative to the support deck to operate the braking mechanism.

8. A braking table system for use in an aircraft cabin, the braking table system comprising:
    a rail mounted on a fixed structure in the aircraft cabin, the fixed structure adjacent a seat assembly; and
    a table assembly mounted on and selectively movable along the rail, the table assembly comprising a support deck engaged with the rail, a tabletop mounted on the support deck, and a braking mechanism carried by the support deck,
    wherein, the braking mechanism automatically engages the rail thereby preventing movement of the support deck relative to the seat assembly, and, upon user action moving the tabletop relative to the support deck, the braking mechanism permits movement of the table assembly relative to the seat assembly,
    wherein, the table assembly is mounted on the rail for linear movement in a first direction, and linear movement in a second direction opposite the first direction, wherein, the braking mechanism comprises a first brake arm biased toward the rail permitting movement of the table assembly in the second direction and, in the absence of user action moving the tabletop relative to the support deck, preventing movement of the table assembly in the first direction by engaging the rail, and a second brake arm biased toward the rail permitting movement of the table assembly in the first direction, in the absence of user action moving the tabletop relative to the support deck, preventing movement of the table assembly in the second direction by engaging the rail, and wherein, the first brake arm extends diagonally toward the rail and in the first direction, and the second brake arm extends diagonally toward the rail and in the second direction.

9. The braking table system of claim 8, wherein the tabletop comprises a brake release bar that extends in a space between the first brake arm and second brake arm, and, upon user action moving the tabletop relative to the support deck, the brake release bar disengages at least one of the first brake arm and second brake arm from the rail.

10. The braking table system of claim 9, wherein the space is V shaped.

11. The braking table system of claim 9, wherein the braking mechanism comprises first and second biasing elements pressing the first and second brake arms toward the brake release bar.

12. The braking table system of claim 8, wherein the rail includes a latching slot, and wherein at least one of the first and second brake arms engages in the latching slot when the table assembly reaches a stowed position, by movement of the table assembly in the first direction, to lock the table assembly in the stowed position.

13. The braking table system of claim 12, wherein, the table assembly comprises a button, and, upon user action pressing the button, the braking mechanism is released from the latched condition to an unlatched condition permitting movement of the table assembly from the stowed position toward the seat assembly.

14. The braking table system of claim 8, wherein a peripheral wall extends from the tabletop defining a receptacle area that receives the support deck, and a peripherally extending gap defined between the peripheral wall and support deck permits movement of the tabletop relative to the support deck to operate the braking mechanism.

\* \* \* \* \*